United States Patent
Lee

(10) Patent No.: US 6,721,831 B1
(45) Date of Patent: Apr. 13, 2004

(54) METHOD FOR CONTROLLING BUS IN DIGITAL INTERFACE

(75) Inventor: Jin Hyuk Lee, Kyonggi-do (KR)

(73) Assignee: LG Electronics, Inc., Seoul (KR)

( * ) Notice: Subject to any disclaimer, the term of this patent is extended or adjusted under 35 U.S.C. 154(b) by 348 days.

(21) Appl. No.: 09/644,229

(22) Filed: Aug. 23, 2000

(30) Foreign Application Priority Data

Aug. 23, 1999 (KR) .......................................... 1999-35031

(51) Int. Cl.$^7$ ............................................... G06F 13/42
(52) U.S. Cl. ........................ 710/105; 710/100; 710/104; 710/107; 710/109; 710/305; 710/9; 710/52; 359/152; 370/391
(58) Field of Search ............................. 710/100, 9, 52, 710/104, 305, 105, 107, 109; 359/152; 370/391

(56) References Cited

U.S. PATENT DOCUMENTS

| | | | |
|---|---|---|---|
| 5,535,208 A | * 7/1996 | Kawakami et al. | 370/391 |
| 5,815,678 A | * 9/1998 | Hoffman et al. | 710/305 |
| 5,845,152 A | * 12/1998 | Anderson et al. | 710/52 |
| 5,991,520 A | * 11/1999 | Smyers et al. | 710/100 |
| 6,038,625 A | * 3/2000 | Ogino et al. | 710/104 |
| 6,108,718 A | * 8/2000 | Fujimori et al. | 710/9 |
| 6,509,988 B1 | * 1/2003 | Saito | 359/152 |

OTHER PUBLICATIONS

IEEE–SA Standards Board, IEEE Standard for a High Performance Serial Bus, 1995, IEEE Computer Society, pp 39–53, 211–242.*
Michael Johas Teener, IEEE 1394–1995 High Performance Serial Bus, Zayante, Inc., 1999.*
Ingrid J. Wickelgren, The facts about Firewire, 1997, IEEE Spectrum, pp 20–24.*
IEEE, "Information Technology—Microprocessor systems–Control and Status Register (CSR) Architecture for microcomputer buses", 1994, The institute of Electrical and Electronics Engineers, Inc.*

* cited by examiner

*Primary Examiner*—Gopal C. Ray
*Assistant Examiner*—Justin King
(74) *Attorney, Agent, or Firm*—Birch, Stewart, Kolasch & Birch, LLP

(57) ABSTRACT

A method for controlling a bus in a digital interface is disclosed. In the present method, after a self identifying process when a bus reset occurs, a determination is made whether a node which needs to transmit isochronous data is a new node which needs to newly transmit isochronous data or a previously connected node which had been transmitting isochronous data before the bus reset. Thereafter, priority is given to previously connected nodes in allocating channels and bandwidth to previously connected node(s).

12 Claims, 6 Drawing Sheets

FIG. 3E
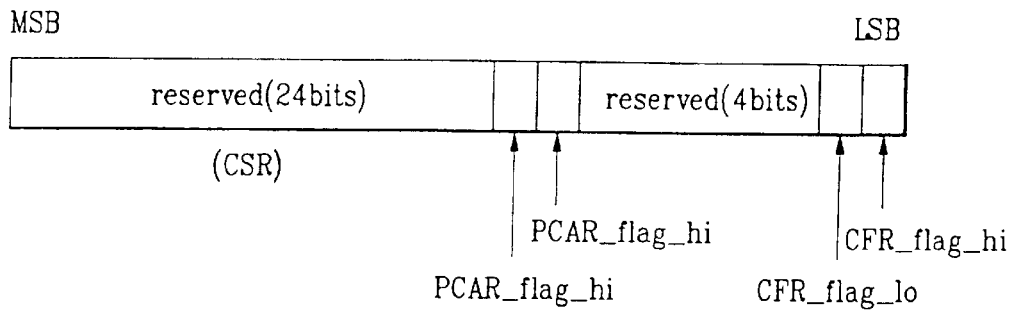
FIG. 3F
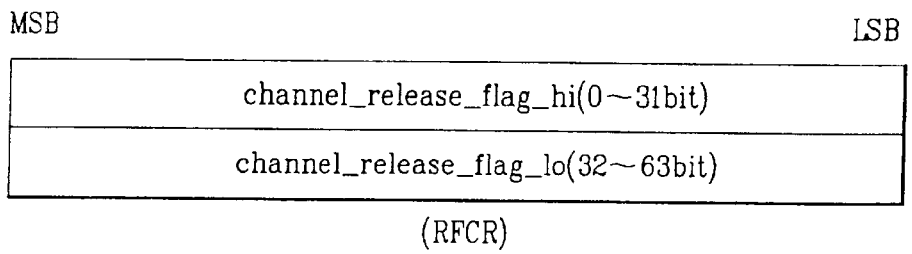
FIG. 3G
| reserved(13bits) | used_bandwidth(13bits) | Node_ID(6bits) | Channel Number |
|---|---|---|---|
| initial value"zeros" | initial value"zeros" | initial value"ones" | 0 |
| ⋮ | ⋮ | ⋮ | ⋮ |
|  |  |  | 63 |
(RRR)

METHOD FOR CONTROLLING BUS IN DIGITAL INTERFACE

BACKGROUND OF THE INVENTION

1. Field of the Invention

The present invention relates to a digital interface, and more particularly to a method for controlling a serial bus in a digital interface.

2. Description of the Related Art

In the latter 1980's, a rapid development of technology in digital audio/video device has increased the need for a high speed digital interface in home consumer electronic devices. As a result, the Institute of Electrical and Electronics Engineers (IEEE) 1394 serial bus has been gaining much interest. Physical connections among devices on the IEEE 1394 serial bus is by a cable which allows bidirectional data transmission. Also, each device has one or more cable connection ports for hot plugging to the IEEE serial bus, thereby enabling addition of a new node to or removal of a node from the bus.

Referring to FIG. 1, assume that an IEEE 1394 serial bus topology includes a digital TV 1 connected to a personal computer (PC) 2, a DVCR 3, a digital camcorder 4, and a DVCR 5; a CDROM 6 and a HDD 7 connected to the PC 2 and a HDD 8 connected to HDD 7; a DVD RAM 9 connected to the DVCR 3; and a PC 10 connected to the digital camcorder 4, and a printer 11 and DVD RAM 12 connected to the PC 10. A. bus reset is generated when a digital camera 13 is newly added to the IEEE 1394 serial bus. Due to a bus reset, a channel (CH) and bandwidth (BW) must be re-assigned to the previously connected devices such as the DVCR 5, DVD RAM 9, CDROM 6 and HDD 8 within a given time period of for example 1000 ms.

The bus configuration is automatically executed during the initialization of the bus and each of the devices, having several cable ports, acts as a repeater to form one local bus. Each port of each device on the bus also has logic for terminators, transceivers, arbitration, packet formatting, and data transfer control. Moreover, the IEEE 1394 serial bus transmits data for control and command using asynchronous packet data structure, and transmits real time data using isochronous packet data structure.

As a result, the IEEE 1394 serial bus has an Isochronous resource manager which provides three registers including a bandwidth available register (BAR), a channel available register (CAR), and a bus manager ID register (BMR). The BAR is a register of 32 bits and indicates the size of the BW used in the isochronous communication. FIG. 2a shows an example of a BAR. A node which needs to start an isochronous communication subtracts a bandwidth from a value of this register for use in the transmission and adds the bandwidth back after the transmission has been completed.

The CAR, as shown in FIG. 2b, is a register of 64 bits and indicates the assigned state of CH used in the isochronous communication. Generally, a bit value of "0" indicates that a CH is being used while a bit value of "1" indicates that the CH is free, i.e. not being used. A node which needs to start an isochronous communication first confirms that the bit value corresponding to a CH for use in the transmission is "1" and converts the bit to a value of "0" before starting the transmission.

The BMR is a register of 32 bits and is used in deciding the bus manager, in which an initial value of 3Fh indicates that a bus manager does not exist. Thus, a node that wants to become the bus manager executes the bus manager's functions by first confirming that the register value is 3Fh and then by establishing its own node ID, within the given time period after a bus reset.

Furthermore, to convert the values of these registers, a compare swap lock transaction is used. Therefore, isochronous packet data is transmitted after establishing a CH and BW through the BAR and CAR.

Accordingly, if a bus reset is generated on the IEEE 1394 serial bus due to an addition or removal of a node while isochronous data is being transmitted to other nodes already connected, the nodes which have been transmitting isochronous data before the bus reset must receive reassignment of a CH and BW within the given time period following the self identifying process in order to continue the isochronous data transmission after the bus reset. Thereafter, a CH and BW, if available, is assigned to node(s) which needs to newly transmit isochronous data. However, in the bus control method in the related art, when a bus reset occurs due to an addition of a node, a CH and BW may not get reassigned to one or more nodes which have been transmitting isochronous data prior to the bus reset within the given time period. In such case, a CH may not be available and/or BW may not be sufficient because of other node(s) which needs to newly transmit isochronous data.

Therefore, although nodes that have been transmitting isochronous data prior to a bus reset have priority over nodes which needs to transmit isochronous data after a bus reset, a node which has been transmitting isochronous data prior to a bus reset may have to wait until a CH and BW becomes available to continue transmission of isochronous data,, if a CH and BW does not get reassigned during the given time period.

SUMMARY OF THE INVENTION

Accordingly, an object of the present invention is to solve at least the problems and disadvantages of the related art.

An object of the present invention is to provide a method for a more efficient control of a serial bus in a digital interface.

Another object of the present invention is to provide a method for controlling a bus in a digital interface which allows nodes on a serial bus to continue transmission of isochronous data that was being transmitting prior to a bus reset caused by new additions of one or more nodes.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method for controlling a serial bus in a digital interface comprises determining whether a node requesting a CH and BW after a given period of time following a self identifying process due to a bus reset is one of either a new node or a previous node which had been transmitting isochronous data before said bus reset; determining whether at least one previous node has not been re-assigned a CH and BW before said given period of time, based upon a CSR, if said node is a new node; assigning a CH and BW to said node, and recording a Node ID and the assigned BW in positions of a RRR corresponding to the assigned CH of said node prior to starting an isochronous data communication, if at least one previous node has not been re-assigned a CH and BW before said given period of time; assigning a CH and BW to said node and starting an isochronous data communication, if there is no previous node which has not been re-assigned a CH and BW after said given period of time; re-assigning a CH and BW to said node after said given period of time by releasing a CH and BW assigned to a new node based upon the RRR, and starting an isochronous data communication, if said node is a previous node and if either one or both a CH and BW are not available; and re-assigning a CH and BW to said node after said given period of time and starting an isochronous data communication if said node is a previous node and if a CH and BW are both available.

BRIEF DESCRIPTION OF THE DRAWINGS

The invention will be described in detail with reference to the following drawings in which like reference numerals refer to like elements wherein:

FIG. 3a to FIG. 3g show inner registers of the isochronous resource manager applied to the bus control method of the present invention.

DETAILED DESCRIPTION OF THE PREFERRED EMBODIMENTS

Reference will now be made in detail to the preferred embodiments of the present invention, examples of which are illustrated in the accompanying drawings. FIG. 3a~3g are schematic views of the inner registers of the isochronous resource manager in the bus control method of the present invention and FIGS. 4a and 4b are flow charts of the bus control method of the present invention.

Referring back to FIG. 1, when a digital camera 13 is added to a serial bus that was transmitting isochronous data, a bus reset occurs. Therefore, the isochronous resource manager (IRM) must reassign a CH and BW to each of the previously connected nodes of DVCR 5, DVD RAM 9, CDROM 6, and HDD 8 that were transmitting isochronous data, within a given time period of, for example, 1000 ms. For purpose of explanation, assume that the CH and BW which had been assigned to the previously connected nodes have respectively been reassigned to the DVD RAM 9, CDROM 6, and HDD 8, but the DVCR 5 does not receive reassignment of a CH and BW from the IRM for some reason.

Figure 3A:
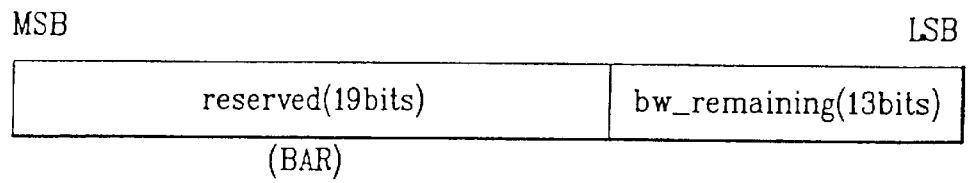
Figure 3B:
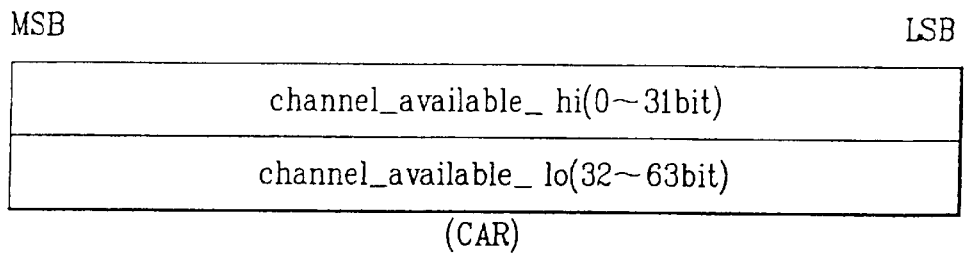
Figure 3C:
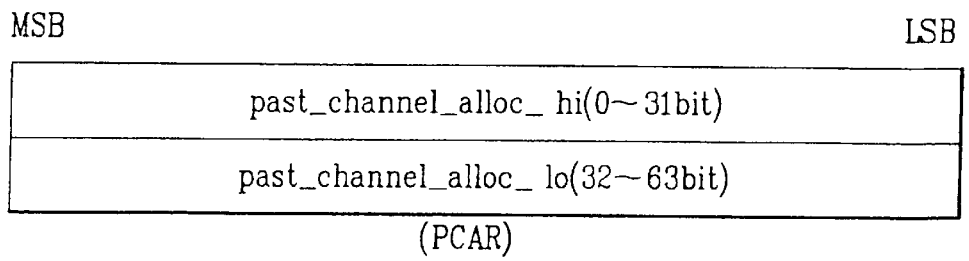
Figure 4A:
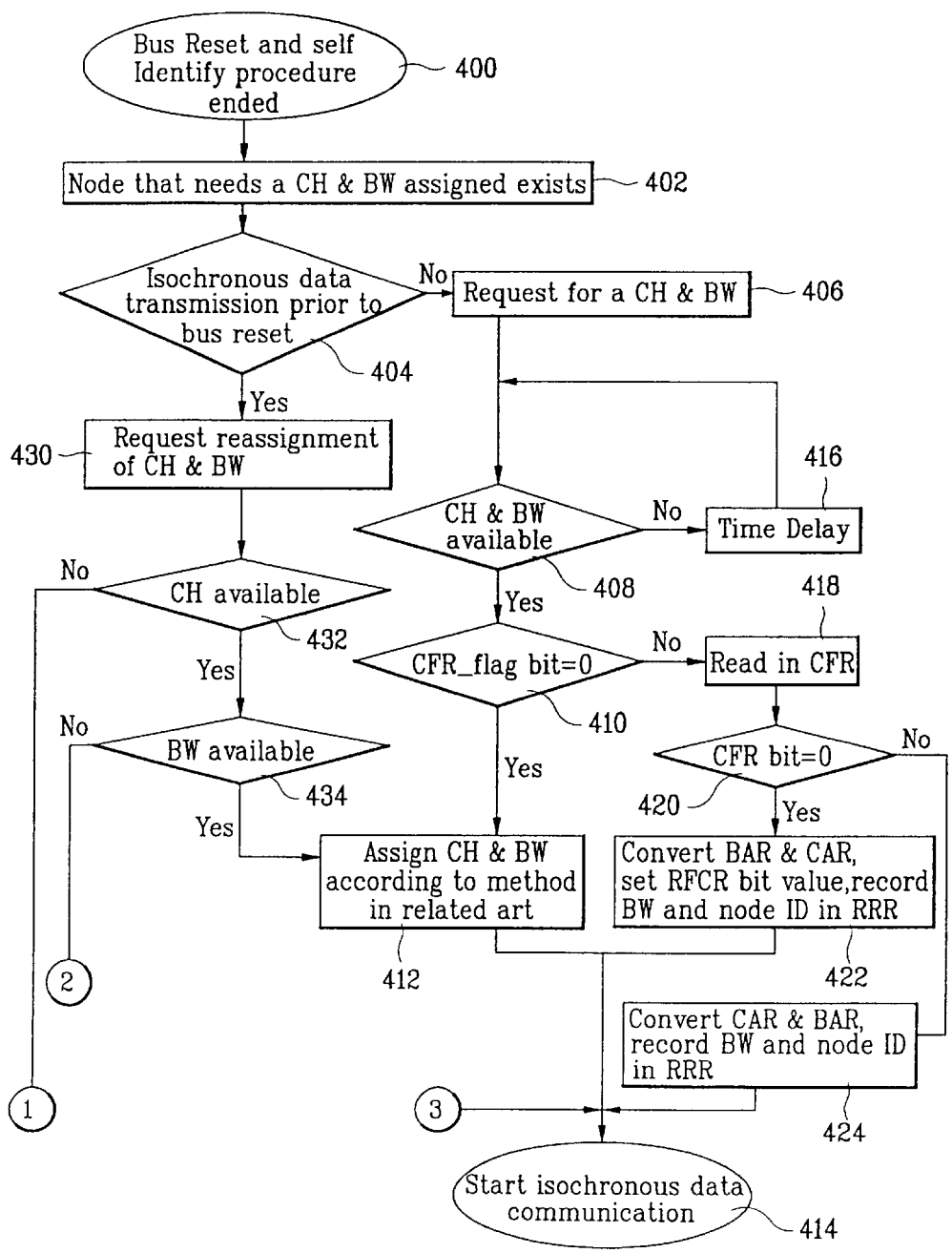
FIGS. 4a and 4b are a flow chart of the bus control method of the present invention.
Figure 4B:
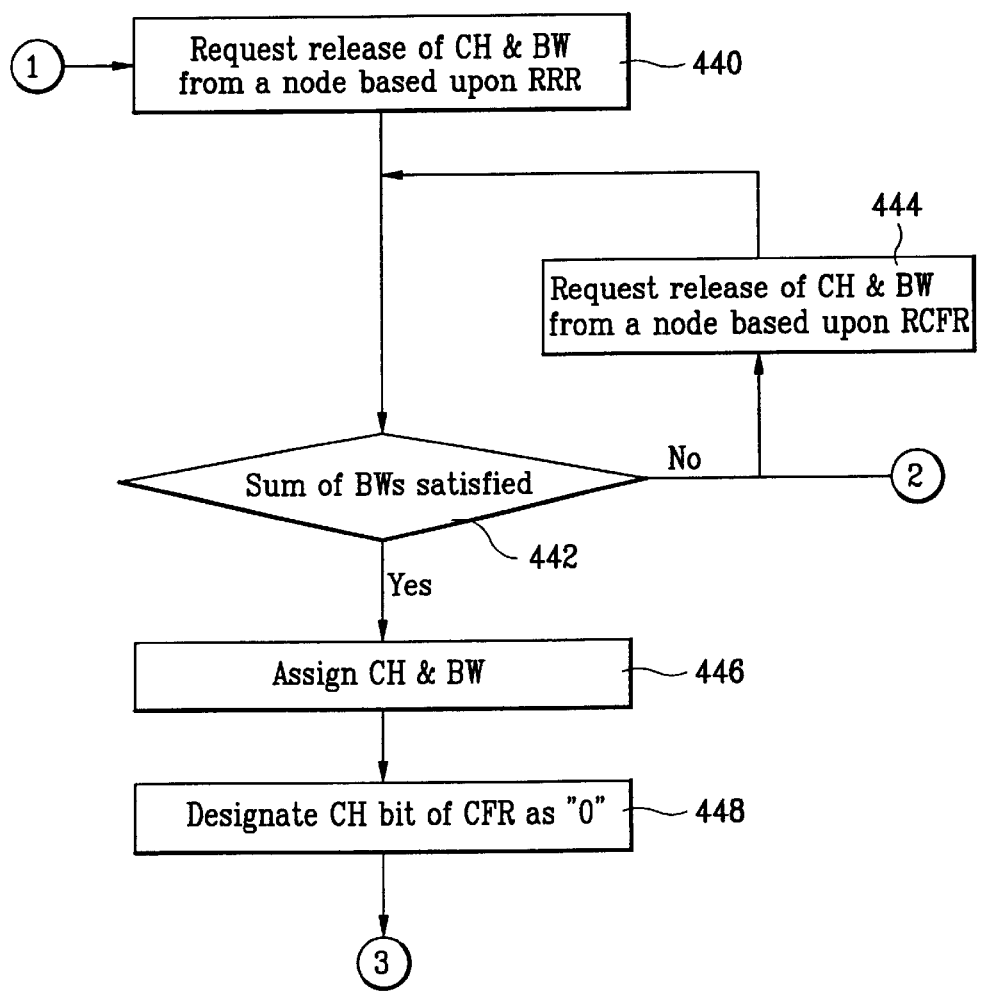

As in the related art, the inner registers of the IRM includes a BAR and a CAR as shown in FIGS. 3a and 3b. However, the IRM according to the present invention further copies data from the CAR, which shows the status of the CH allocation prior a bus reset, into a past channel allocation register (PCAR). The PCAR, as shown in FIG. 3c indicates which node(s) had been assigned a CH for transmission of isochronous data before a bus reset.

After copying data of the CAR to the PCAR, the IRM logically ANDs all bits of the PCAR_hi and logically ANDs all bits of the PCAR_lo, and respectively stores the logic products as PCAR_Flag_hi and PCAR_Flag_lo in a control status register (CSR) shown in FIG. 3E. If a bit value of "0" in the PCAR is set to indicates that a CH is being used while a bit value of "1" indicates that the CH is free, a value of "0" for either of the PCAR_Flag indicates that one or more nodes had been transmitting isochronous data before the bus reset.

Figure 3D:
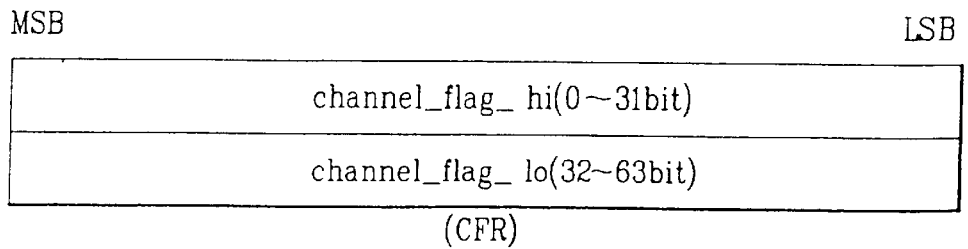

Accordingly, after the self identifying process when a bus reset occurs, the IRM checks the values of the PCAR_Flag_hi and the PCAR_Flag_lo during the given time period. If the value of either PCAR_Flag is "0," the IRM logically Exclusive ORs each corresponding bit values of the CAR and the PCAR after the elapse of the given time period, and respectively stores the result as a channel_flag_hi and channel_flag_lo in a Channel Flag Register (CFR) as shown in FIG. 3D. Thereafter, the IRM logically ORs all bits of the Channel_flag_hi and Channel_flag_lo, and respectively stores the logic products as a CFR_Flag_hi and CFR_Flag_lo in the CSR. Here, a value of "1" for either one of the CFR_Flag indicates that at least one node among nodes that were transmitting isochronous data before the bus reset has not been reassigned a CH and BW within the given time period.

Therefore, the present invention can detect whether a node which had been transmitting isochronous data before a bus reset has failed to be re-assigned a CH and BW within the given time period, using the CFR_Flag. Accordingly, the present invention gives priority to the node which had been transmitting isochronous data before a bus reset in assigning a CH and BW after a bus reset. FIGS. 4a and 4b show a CH and BW allocation after a bus reset according to the present invention. The operation will be explained with reference to FIG. 1.

Referring to FIG. 4a, after a self identifying procedure when a bus reset occurs (400), if a node which needs to transmit or receive isochronous data exists (402), a determination is made whether the node is one of the previously connected node which had been transmitting isochronous data prior to the bus reset (404).

Figure 1:
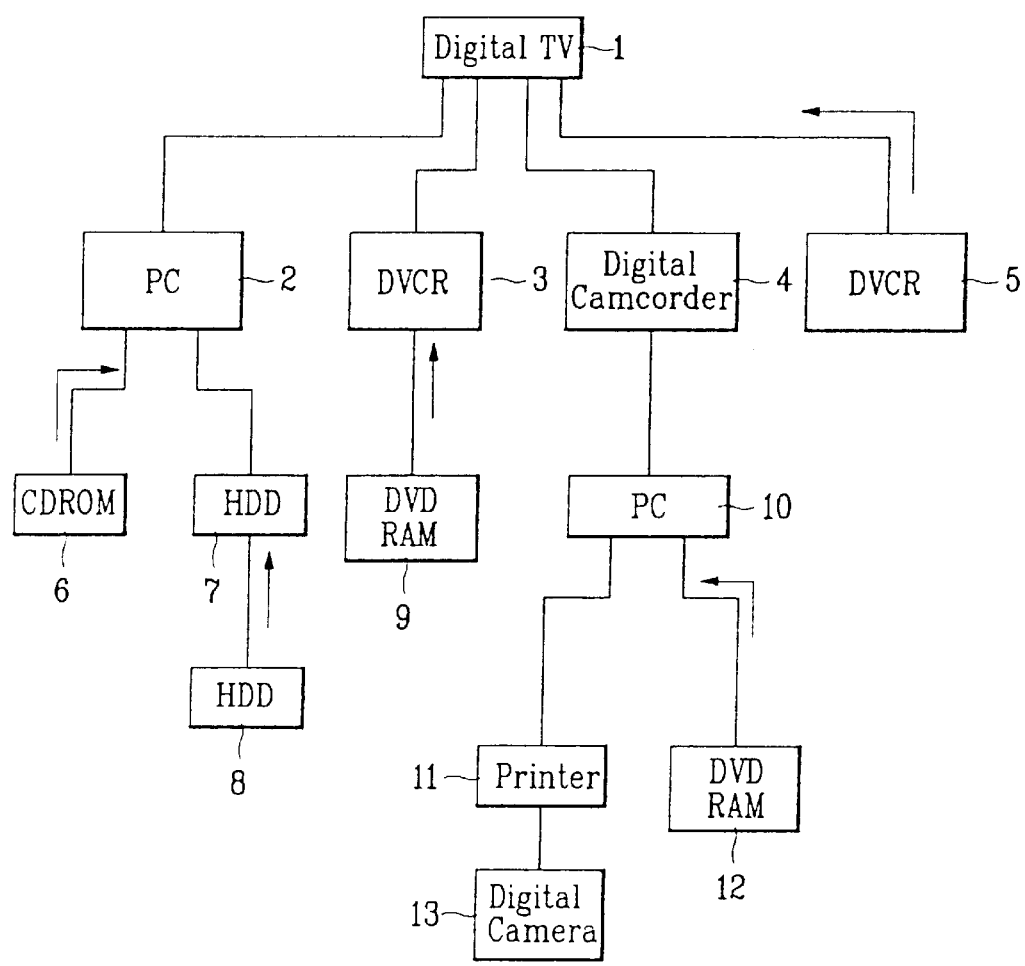
FIG. 1 is a block diagram showing one embodiment of a topology of node connected by the IEEE 1394 serial bus in accordance with the conventional art.
Figure 2A:
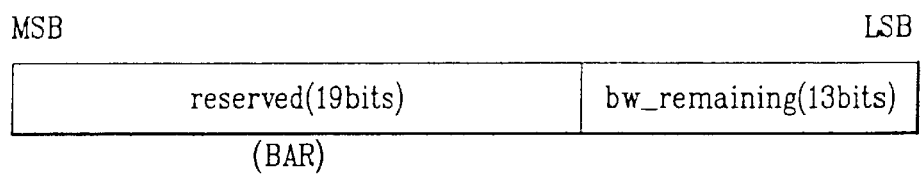
FIGS. 2a and 2b show inner registers of the isochronous resource manager in the related art.
Figure 2B:
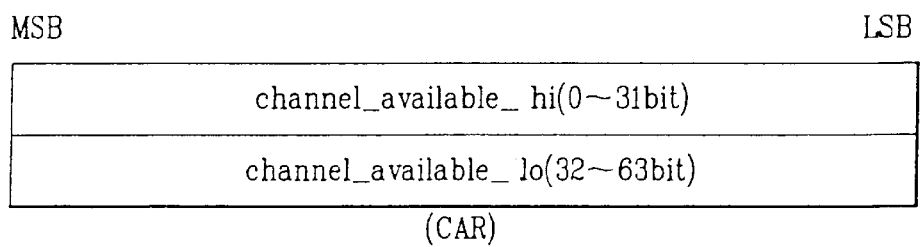

If the node is a new node such as the DVD RAM 12 in FIG. 1, the node requests for a CH and BW through the CAR and BAR of the IRM (406). Thereafter, if the requested CH and BW are available (408), either the CFR_Flag_hi or CFR_Flag_lo of the CSR corresponding to the requested CH is checked (410). Here, a value of "0" would indicate that all nodes, if any, that were transmitting isochronous data before the bus reset has been reassigned a CH and BW within the given time period. Thus, if the value of the CFR Flag is "0," the DVD RAM 12, i.e. the new node, is assigned the requested CH and BW according to the allocation method in the related art (412) to transmit the isochronous data (414).

However, if the CH and BW are not available in 408, a re-determination is made whether a CH and BW is available after a predetermined time delay (416). This re-determination is repeatedly made after a lapse of the predetermined time delay until a CH and BW does become available.

Also, if the value of the CFR_Flag is "1" in 410, the DVD RAM 12 reads one of the channel_flag_hi or Channel_flag_lo of the CFR corresponding to a requested CH (418). A channel_flag value of "0" would indicate that the channel had not previously been assigned prior to the bus reset. Accordingly, if the channel_flag value of a requested CH is "0" (420), the DVD RAM 12 converts a bit value of the CAR and subtracts a BW from the BAR, corresponding to the requested CH and BW; sets a corresponding bit value of a Releasable Channel Flag Register (RCFR) as,shown in FIG. 3f to a value of "1"; and records the allocated BW and the node ID in positions of the Resource Releasable Register (RRR) corresponding to the CH as shown in FIG. 3g (422). Thereafter, the DVD RAM 12 begins isochronous data communication (414).

As shown in FIG. 3g, the RRR includes a reserved bit value, a used_bandwidth bit value, and Node_ID bit value in registers corresponding to each channel. The initial bit values of the reserved and used bandwidth are "0" while the initial bit values of the Node_ID is "1."

Because the value of the CFR_Flag is "1," if the channel_flag value of a requested CH is "1" in 420, the DVD RAM 12 converts a bit value of the CAR and subtracts a BW from the BAR, corresponding to the requested CH and BW; and records the allocated BW and the node ID in positions of the Resource Releasable Register (RRR) corresponding to the CH (424). However, the RCFR value is not changed. Thereafter, the DVD RAM 12 begins isochronous data communication (414).

If a node which needs to transmit or receive isochronous data is one of the previously connected node which had been transmitting isochronous data prior to the bus reset, such as the DVCR 5 in FIG. 1, the node requests for a re-assignment of a CH and BW through the CAR and the BAR of the IRM (430) to continue transmitting the isochronous data. Thereafter, the DVCR respectively checks the CAR and the BAR to determine if the requested CH and BW are available and if available (432 and 434), the requested CH and BW are re-assigned to the DVCR 5 according to the allocation method in the related art (412) to transmit the isochronous data (414).

However, if the requested CH has been assigned to another node, for example the DVD RAM 12, the requested CH would not be available. Therefore, if the requested CH is not available, the DVCR 5 requests for a release of the CH from a node recorded in a position of the RRR corresponding to the requested CH (440). Subsequently, the DVCR 5 adds the BW recorded in the position corresponding to the requested CH with the free BW within the BAR of the IRM. If the sum of the BWs is not enough to assign the necessary BW to the DVCR 5 (442), the DVCR 5 requests for a release of the CH and additional BW from a node recorded in a position of the RRR corresponding to a CH with a RCFR bit value of "1" (444).

The DVCR 5 continues to add the further released BW to the sum of BWs and repeats 442 and 444 until the sum of BWs becomes wide enough to assign the necessary BW to the DVCR 5. Thus, the requested CH and BW are re-assigned to the DVCR (446) and the bit value of the CFR corresponding to the requested CH is set to "0."

Similarly, if a requested CH is available, but a requested amount of BW is not available in 434, the DVCR 5 requests for a release of the CH and additional BW from a node recorded in a position of the RRR corresponding to a CH with a RCFR bit value of "1" (444), and repeats 442 and 444 until the sum of BWs becomes wide enough to assign the necessary BW to the DVCR 5. Accordingly, the requested CH and BW are re-assigned to the DVCR (446).

Here, the situation in which the requested CH is available while the requested BW is not available would arise when a new node which needs to transmit or receive isochronous data is assigned a CH which had not previously been assigned prior to a bus reset. Therefore, the bit value of the CFR corresponding to the requested CH need not be converted because it would already be "0."

As described above, the bus control method in a digital interface according to the present invention allows nodes on the bus to continue transmission of isochronous data if such nodes were transmitting data prior to a bus reset by re-assigning CH and BW allocated to new nodes back to the previously connected nodes, when CH and BW are limited.

Although the present embodiment divides the PCAR, the CFR, and RCFR into "hi" and "lo" bits to correspond to the BAR and the CAR, the division may be omitted. Also, the PCAR_flag_hi and PCAR_flag_lo may be combined into one PCAR_flag and stored in the CSR. Similarly, the CFR_flag_hi and the CFR_flag_lo may be combined into one CFR_flag and stored in the CSR.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for controlling a bus comprising:
   (a1) determining whether a requesting node requesting one of a plurality of channels (CHs) and one of a plurality of bandwidths (BWs) after a given period of time following a self-identifying process due to a bus reset is one of either a new node or any one of a plurality of previous nodes which had been transmitting isochronous data before said bus reset;
   (b1) determining whether at least one of the previous nodes has not been reassigned one of said plurality of CHs and one of said plurality of BWs before said given period of time, based upon a control status request (CSR), if said requesting node is said new node, said step (b1) comprising:
      copying and storing data from a channel available register (CAR) of an isochronous resource manager (IRM) into a past channel allocation register (PCAR) of an IRM, executing a logical AND function on all bits of the PCAR and storing the logic product as a PCAR_Flag in the CSR, where said PCAR_Flag indicates whether said at least one of the previous nodes is present;
      executing a logical Exclusive OR function on each corresponding bit value of the CAR and the PCAR, and respectively storing a result of the logical Exclusive OR function as a channel_flag in the channel flag register (CFR), if said PCAR_Flag indicates that said at least one of said previous nodes is present; and
      executing a logical OR function on all bits of the CFR and storing a product of the logical OR function as a CFR_Flag in the CSR, where said CFR_Flag indicates whether said at least one of said previous nodes has not been reassigned one of said CHs and one of said BWs;
   (c1) assigning one of said CHs and one of said BWs to said at least one of the previous nodes, and recording a Node ID and the assigned BW in positions of a resource releasable register (RRR) corresponding to the assigned one of said CHs of said at least one of the previous nodes prior to starting an isochronous data communication, if said at least one of said previous nodes has not been reassigned one of said CHs and one of said BWs before said given period of time;
   (d1) assigning one of said CHs and one of said BWs to said new node and starting said isochronous data communication, if each of said at least one of the previous nodes has been reassigned one of said CHs and one of said BWs after said given period of time;

(e1) reassigning one of said CHs and one of said BWs to said requesting node after said given period of time by releasing said one of said CHs and said one of said BWs assigned to said new node based upon the RRR, and starting said isochronous data communication, if said requesting node is said at least one of the previous nodes and if either one or both said one of said CHs and said one of said BWs are not available; and (f1) reassigning one of said CHs and one of said BWs to said requesting node after said given period of time and starting said isochronous data communication if said requesting node is said at least one of the previous nodes and if said one of said CHs and said one of said BWs are both available.

2. The method of claim 1, wherein step (a1) further comprises:
copying and storing data from the CAR of the IRM into the PCAR of the IRM, and determining whether said node requesting said one of said CHs and said one of said BWs is one of either said new node or one of said at least one of the previous nodes.

3. The method of claim 2, wherein if a bit value of "0" in the CAR indicates that said one of said CHs is being used and if a bit value of "1" indicates that said one of said CHs is free, a value of "0" for the PCAR_Flag indicates said at least one of the previous nodes is present.

4. The method of claim 1, wherein step (c1) further comprises:
subtracting the assigned one of said BWs from a bandwidth available register (BAR), converting a bit value of the CAR corresponding to the assigned one of said CHs, and setting a bit value of a releasable channel flag register (RCFR) corresponding to the assigned one of said CHs to a predetermined value, prior to starting said isochronous data communication, if the assigned one of said CHs had not been previously assigned prior to the bus reset; and
subtracting the assigned one of said CHs from the BAR, converting a bit value of the CAR corresponding to the assigned one of said CHs prior to starting said isochronous data communication, if the assigned one of the CHs had been previously assigned prior to the bus reset.

5. The method of claim 4, wherein in step (e1), reassigning said one of said CHs and one of said BWs to said requesting node comprises:
requesting a reassignment of another of said CHs and another of said BWs;
requesting a release of the another of said CHs from the node recorded in a position of the RRR corresponding to the another of said CHs, if the another of said CHs is not available;
adding another of said BWs recorded in the position corresponding to the another of said CHs with a free one of said BWs within the BAR of the IRM, where a sum of the BWs becomes an updated free BW within the BAR of the IRM; and
requesting for a release of CH still another of said CHs and still another of said BWs from a node recorded in a position of the RRR corresponding to one of the CHs with a RCFR bit value set to the predetermined value if the sum of said BWs is not enough for reassignment to said requesting node, and otherwise re-assigning the another of said CHs and said another of said BWs to said requesting node.

6. The method of claim 4, wherein in step (e1), reassigning said one of said CHs and and one of said BWs to said requesting node comprises:

(a2) requesting a re-assignment of another of said CHs and another of said BWs;

(b2) requesting for a release of still another of said CHs and still another of said BWs from the node recorded in a position of the RRR corresponding to a CH with a RCFR bit value set to the predetermined value, if the another of said CHs is available and if a free one of the BWs within the BAR of the IRM is not enough for re-assignment to said requesting node;

(c2) adding still another of said BWs recorded in the position corresponding to the still another of said CHs with the free BW within the BAR of the IRM, where a sum of said BWs becomes an updated free BW within the BAR of the IRM, and repeating steps (b2) and (c2) until the sum of said BWs is enough to assign the updated free BW to said requesting node; and (d2) assigning the another of said CHs and said another of the BWs to said requesting node if the sum of BWs is enough to assign the updated free BW to said requesting node.

7. The method of claim 4, wherein the predetermined value is "1."

8. A method for allocating a plurality of channels (CHs) and a plurality of bandwidths (BWs) among a plurality of nodes in a bus after a bus reset comprising:

(a1) copying data from a channel available register (CAR) into a past channel allocation register (PCAR) of an isochronous resource manager (IRM);

(b1) executing a logical AND function on all bits of the PCAR and storing a product of the logical AND function as a PCAR_Flag in a control status report (CSR);

(c1) executing a logical Exclusive OR function on each corresponding bit values of the CAR and the PCAR, and respectively storing a result of the logical Exclusive OR function as a channel_flag in a channel flag register (CFR), if said PCAR_Flag is equal to a first predetermined value;

(d1) executing a logical OR function on all bits of the CFR and storing a product of the logical OR function as a CFR_Flag in the CSR;

(e1) determining whether a requesting node requesting one of said CHs and one of said BWs after a given period of time following a self identifying process due to the bus reset is one of either a new node which needs to newly transmit isochronous data or any one of a plurality of previously connected nodes which had been transmitting isochronous data before said bus reset;

(f1) determining whether at least one of the previously connected nodes has not been reassigned one of said CHs and one of said BWs before said given period of time, based upon the CFR_Flag, if said requesting node is said new node;

(g1) assigning one of said CHs and one of said BWs to said at least one of the previously connected nodes, and recording a Node ID and said one of said BWs in positions of a resource releasable register (RRR) corresponding to the assigned one of said CHs of said at least one of the previously connected nodes prior to starting an isochronous data communication, if said CFR_Flag is equal to a second predetermined value;

(h1) assigning one of said CHs and one of said BWs to said new node and starting said isochronous data communication, if said CFR_Flag is not equal to the second predetermined value;

(i1) reassigning one of said CHs and one of said BWs to said requesting node after said given period of time by releasing said one of said CHs and said one of said BWs assigned to said new node based upon the RRR, and starting said isochronous data communication, if said requesting node is said at least one of the previously connected nodes and if either one or both of one of said CHs and one of said BWs are not available; and (j1) reassigning one of said CHs and one of said BWs to said requesting node after said given period of time and starting said isochronous data communication if said requesting node is said at least one of the previously connected nodes and if said one of said CHs and said one of said BWs are both available.

9. The method of claim 8, wherein the first predetermined value is "0" and the second predetermined value is "0," if a bit value of "0" in the CAR indicates that a CH is being used while a bit value of "1" indicates that said one of said CHs is free.

10. The method of claim 8, wherein step (g1) further comprises:

subtracting the assigned one of said BWs from a bandwidth available register (BAR), converting a bit value of the CAR corresponding to the assigned one of said CHs, and setting a bit value of a releasable channel flag register (RCFR) corresponding to the assigned one of said CHs to a predetermined value, prior to starting said isochronous data communication, if the assigned one of said CHs had not been previously assigned prior to the bus reset; and subtracting the assigned one of said BWs from the BAR, converting a bit value of the CAR corresponding to the assigned one of said CHs prior to starting said isochronous data communication, if the assigned one of the CHs had been previously assigned prior to the bus reset.

11. The method of claim 10, wherein in step (i1), reassigning said one of said CHs and said one of said BWs to said requesting node comprises:

requesting a re-assignment of another of said CHs and another of said BWs;

requesting a release of the another of said CHs from said new node recorded in a position of the RRR corresponding to the another of said CHs, if the another of said CHs is not available;

adding a another of said BWs recorded in the position corresponding to the another of said CHs with a free one of said BWs within the BAR of the IRM, where a sum of said BWs becomes an updated free BW within the BAR of the IRM; and requesting for a release of still another of said CHs and still another of said BWs from the node recorded in a position of the RRR corresponding to one of said CHs with a RCFR bit value set to a third predetermined value if the sum of said BWs is not enough for reassignment to said requesting node, and otherwise reassigning the another of said CHs and said another of said BWs to said requesting node.

12. The method of claim 10, wherein in step (i1), reassigning said one of said CHs and said one of said BWs to said requesting node comprises:

(a2) requesting a reassignment of another of said CHs and another of said BWs;

(b2) requesting for a release of still another of said CHs and still another of said BWs from the node recorded in a position of the RRR corresponding to one of said CHs with a RCFR bit value set to a third predetermined value, if the another of said CHs is available and if a free BW within the BAR of the IRM is not enough for reassignment to said requesting node;

(c2) adding still another of said BWs recorded in the position corresponding to the still another of said CHs with the free BW within the BAR of the IRM, where a sum of said BWs becomes an updated free BW within the BAR of the IRM, and repeating steps (b2) and (c2) until the sum of said BWs is enough to assign the updated free BW to said requesting node; and (d2) assigning the another of the CHs and said to said requesting node if the sum of said BWs is enough to assign the updated free BW to said requesting node.

* * * * *